Figure 1:
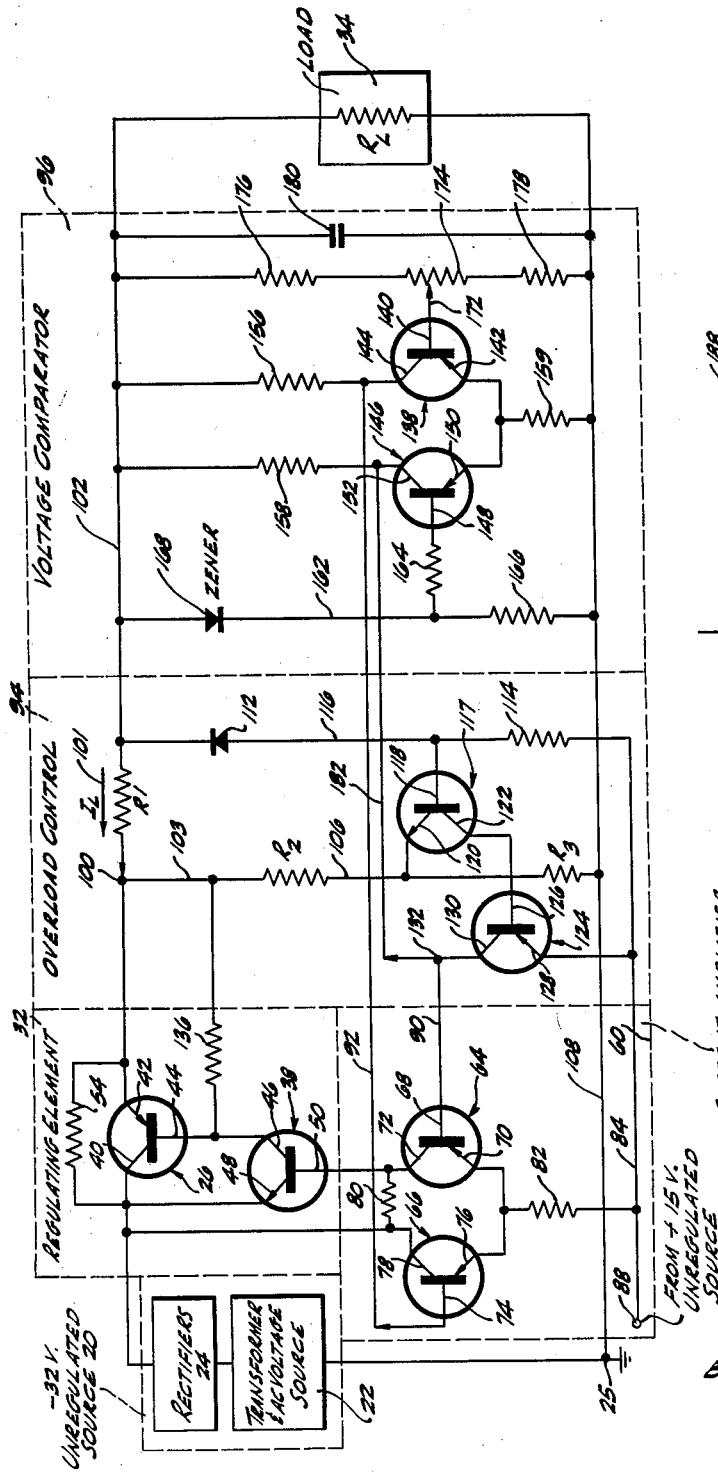

Jan. 29, 1963  R. P. FARNSWORTH ETAL  3,076,135
POWER SUPPLY CIRCUIT
Filed Sept. 29, 1958

INVENTORS.
ROBERT P. FARNSWORTH,
LEONARD AZAR,
BY
Walter J. Adam
ATTORNEY.

3,076,135
POWER SUPPLY CIRCUIT
Robert P. Farnsworth, Los Angeles, and Leonard Azar, Culver City, Calif., assignors to Hughes Aircraft Company, Culver City, Calif., a corporation of Delaware
Filed Sept. 29, 1958, Ser. No. 765,698
11 Claims. (Cl. 323—22)

This invention relates to power supplies and particularly to a direct-current power supply utilizing a fast acting overload protection circuit.

In the prior art, D.C. (direct current) power supplies were used in connection with vacuum tubes and delivered relatively high output voltages and could operate with relatively high output impedances. However, with transistor circuitry, power supplies may be required to supply relatively low output voltages while supplying current of 25 amperes or more. The output impedance of the power supply may be required to be less than $10^{-3}$ ohms. These problems have been solved by utilizing power supplies with high power transistors for regulation and low forward resistance diodes for rectification.

The low output impedance from these power supplies has created new problems, the most formidable one being that of protecting the power supply and the load against short-circuits or accidental overloads. During a short-circuit or accidental overload condition, destruction of the transistors and rectifiers of the power supply as well as destruction of the transistor circuitry being supplied with power occurs at a fast rate. The time required for destruction may be in the order of 100 microseconds under severe conditions. Conventional fuses or mechanical disconnections require 20 to 30 milliseconds to open, which operation is far too slow to protect transistors. Some electronic disconnect circuitry of the prior art samples signal current in a regulator loop and provide turn-off of the supply when the signal current reaches a preset value. The shortcoming of this system is that the signal current is related to the load current by the gain of one or more stages of the supply, which gain is dependent upon ageing and temperature of the circuit elements, as well as upon supply voltages. Thus, the turn-off current is variable and changes under these conditions so as to not consistently disconnect the power supply at a fixed maximum load current.

Also, some conventional power supplies having automatic turn-off characteristics follow a turn-off path which although allowing them to turn on under full load after removal of a short circuit condition, will also allow them to exceed maximum dissipations under partial short circuit. Other conventional power supplies follow a path which allows them to turn completely off when an overload condition occurs under full load but requires partial removal of the full load to turn on after the overload or short circuit condition has been corrected. These turn-on and turn-off characteristics may result from the non-linearities of the system components. A system which would provide fast operating overload protection, that would provide overload protection at a fixed maximum load current independent of the gain of the circuit elements, and which would turn both completely off and completely on when a short circuit condition occurs and is removed at full load, would have wide use, especially with transistor circuitry.

It is, therefore, an object of this invention to provide a power supply which rapidly disconnects from its load upon the occurrence of a short circuit or an overload condition.

It is a further object of this invention to provide a transistor power supply which turns off under an overload condition and turns on upon removal of the overload condition at a consistent maximum load current value, independent of temperature and ageing of the amplifying elements in the circuit.

It is a still further object of this invention to provide a fast acting power supply utilizing transistors which will not only completely disconnect the source from the load during an overload condition when operating at full rated power but will return to supplying full rated power upon removal of the overload condition.

Another object of this invention is to provide a transistor power supply having a simplified overload protection circuit for protecting both the power supply and the supplied circuitry, and which operates to disconnect the power supply at a predetermined rated current independent of changes of characteristics of the transistor due to ageing and temperature.

According to one feature of this invention, a power supply receives unregulated direct current voltage from a transformer and rectifier arrangement, and supplies it to a load through a series connected regulating, or control, transistor which varies in static impedance in response to changes of its base current. A voltage comparator including a first differential amplifier and a voltage divider both connected across the load, is utilized to control a current signal in response to changes in the load voltage or potential difference. A second differential amplifier is connected to the base of the control transistor and is connected to the first differential amplifier for responding to the changes of the current signal to maintain the constant load voltage. An overload control circuit is provided including a resistor connected from a terminal of the control transistor and in series with the load to form a first voltage divider and including a second voltage divider connected from the same terminal of the control transistor to the other side of the load. A signal-forming transistor is connected between the first and the second voltage dividers so as to respond to a predetermined polarity of potential difference indicating maximum rated load. The signal forming transistor is connected to shunt out the current from the first differential amplifier in response to the predetermined polarity which in turn biases the regulating transistor out of conduction to effectively disconnect the source from the load. A leakage path across the control transistor maintains this disconnected condition by supplying a small current through the first and second voltage dividers. When the overload condition is removed the potential difference between the first and second voltage dividers returns to a polarity to bias the signal-forming transistor out of conduction, thus allowing the voltage comparator circuit to continue its regulating operation at any load up to maximum load.

Figure 2:
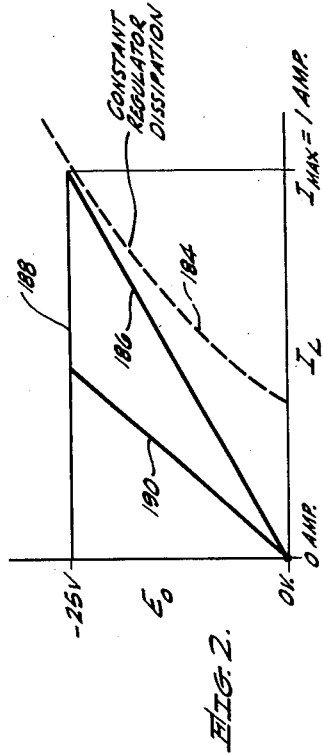

The novel features of this invention, as well as the invention itself, both as to its organization and method of operation, will best be understood from the accompanying description, taken in connection with the accompanying drawings, in which:

FIG. 1 is a schematic diagram of the power supply circuit of this invention; and FIG. 2 is a graph to illustrate the operation of the circuit of FIG. 1.

Referring first to FIG. 1, a schematic circuit diagram is shown of the power supply circuit including the overload protection arrangement of this invention. The power supply of this invention receives unregulated voltage, which may be −32 volts, from an unregulated voltage source 20 comprising a transformer and alternating current voltage source 22 connected to a terminal 25 which may be at ground potential and a rectifier 24 connected to the transformer and voltage source 22. The unregulated voltage source 20 supplies power through a regulating transistor 26 of a regulating element circuit 32 to a load 34, which may include a resistor $R_L$, and is connected to the terminal 25 through a ground lead 103. The regulating element circuit 32 also includes a driver transistor 38. The regulating transistor 26 which may be of the PNP type has a base 44, an emitter 42 and a collector 40, and the driver transistor 38 which may be of the NPN type has a base 50, an emitter 48, and a collector 46. The collector 40 of the regulating transistor 26 is connected to the rectifier 24 and the base 44 of the regulating transistor 26 is connected to the collector 46 of the driver transistor 38. The emitter 48 of the driver transistor 38 is connected to the collector 40 of the regulating transistor 26 to provide a return path for current from the base 44 of the regulating transistor 26, as will be explained subsequently. A leakage resistor 54 is connected between the collector 40 and the emitter 42 of the regulating transistor 26 and, as will be explained hereinafter, passes a current to maintain the circuit disconnected during an overload condition.

The base 50 of the driver transistor 38 is connected to a current-amplifier circuit 60 which utilizes a differential amplifier for controlling the current passed into the base 50 of the driver transistor 38. The differential amplifier includes a transistor 64 and a transistor 66 both of which may be of the PNP type. The transistor 64 has a base 68, an emitter 70, and a collector 72, and the transistor 66 has a base 74, an emitter 76, and a collector 78. The collector 72 of the transistor 64 is connected to the base 50 of the transistor 38 and the collector 78 of the transistor 66 is connected to the collector 40 of the regulating transistor 26. A biasing resistor 80 is connected between the collector 72 of the transistor 64 and the collector 78 of the transistor 66 to provide a leakage current path from the base 50 of the transistor 38 when the transistor 38 is biased out of conduction, as will be explained subsequently. The emitters 70 and 76 of the transistors 64 and 66 are connected by way of a current-limiting resistor 82 to a lead 84. The lead 84 is connected to a terminal 88 which may be connected to a +15 voltage unregulated source (not shown), which provides a bias for maintaining operation of the circuit during an overload condition. The base 68 of the transistor 64 is connected to a lead 90 and the base 74 of the transistor 66 is connected to a lead 92 through which leads, control current passes, as will be explained subsequently. Thus, the current amplifier circuit 60 is connected for controlling the regulating element circuit 32.

The current amplifier circuit 60 is controlled by an overload control circuit 94 and a voltage comparator circuit 96. The overload control circuit 94 includes a resistor $R_1$ having one end connected to a junction 100 which, in turn, is connected to the emitter 42 of the regulating transistor 26. The other end of the resistor $R_1$ is connected through a lead 102 to the resistor $R_L$ of the load 34. The load current $I_L$ is indicated by an arrow 101. The resistor $R_1$ in combination with the resistor $R_L$ of the load 34 provides a first voltage divider, as will be explained subsequently. The junction 100 is also connected through a lead 103 to a resistor $R_2$ which in turn is connected to one end of a resistor $R_3$ by way of a lead 106. The other end of the resistor $R_3$ is connected to the ground lead 108. The lead 102 is connected to the cathode of a diode 112 which has its anode connected to one end of a resistor 114 by lead 116. The other end of the resistor 114 is connected to the lead 84.

A signal transistor 117 which may be of the NPN type has a base 118, an emitter 120, and a collector 122 with the base 118 connected to the lead 116 and the emitter 120 connected to the lead 106. As will be explained subsequently, the difference in potential drop across the resistor $R_1$ and the diode 112 and across the resistor $R_2$, which potential difference appears between the leads 116 and 106, determines whether transistor 117 is biased into conduction. The collector 122 of the transistor 117 is connected to the base 126 of a transistor 124 which may be of the PNP type. The transistor 124 has an emitter 128 which is connected to the lead 84 and has a collector 130 which is connected to the lead 90 at a junction 132. Thus, it can be seen that current passes into the junction 132 either from the transistor 124 or from the transistor 64 of the current amplifier circuit 60. The lead 103 is also connected to the base 44 of the regulating transistor 26 by way of a biasing resistor 136 which acts to pass leakage current from the base 44 to maintain the regulating transistor 26 biased when in its nonconducting state, as will be explained subsequently.

The voltage comparator circuit 96 includes transistors 138 and 146 arranged as a second differential amplifier circuit. The transistors 138 and 146 may be of the PNP type. The transistor 138 has a base 140, an emitter 142, and a collector 144, and the transistor 146 has a base 148, and emitter 150, and a collector 152. The collector 144 of the transistor 138 is connected to the lead 102 by way of a biasing resistor 156 and the collector 152 of the transistor 146 is connected to the lead 102 by way of a biasing resistor 158. The emitters 142 and 150 of the transistors 138 and 146 are connected to ground lead 108 by way of a current limiting resistor 159. The base 148 of the transistor 146 is connected to a lead 162 by way of an impedance-matching resistor 164. The lead 162 is connected to the ground lead 108 by way of a resistor 166 and is connected to the cathode of a diode 168, which may be a Zener type diode. The anode of the diode 168 is connected to the lead 102 to provide a potential to the base 148 of the transistor 146 which follows the variation of the load potential on the lead 102. It is to be noted that the resistor 164 is utilized to match the impedance out of the base 148 of the transistor 146 to the impedance out of the base 140 of the transistor 138.

The base 140 of the transistor 138 is connected by a variable tap 172 to a resistor 174, one end of which is connected to the lead 102 by way of a resistor 176 and the other end of which is connected to ground lead 108 by way of a resistor 178. The resistors 174, 176, and 178 thus are a voltage divider of the potential difference across the load 34 for dividing out a potential to control the conduction of the transistor 138. The collector 144 of the transistor 138 is connected to the lead 92 which, in turn controls the conduction of the transistor 66, as will be explained subsequently. The collector 152 of the transistor 146 is connected to a lead 182 which, in turn is connected to the junction 132 for receiivng current from either the transistor 64 during normal regulation or from the transistor 124 during an overload condition, as will also be explained subsequently. A capacitor 180 is coupled across the leads 102 and 108 to stabilize the circuit for providing a low output impedance to signals on the lead 102 at a frequency above the frequency response of the transistors in the circuit, as is well known in the art.

The operation of the voltage regulator of this invention includes both normal voltage regulation of the load voltage on the lead 102 to maintain a regulated voltage and overload protection during operation when, for example, a fault such as a short circuit of the load 34 occurs. During normal regulation, the regulating circuit controls the current through the series element which is the transistor 26, to correct variations of the regulated potential on the lead 102 caused either by voltage fluctuations of the source 20 or by small variations of the effective resistance of the load 34. A rise of potential on the collector 40 from a positive-going fluctuation of the unregulated potential from source 20 decreases the emitter to collector potential of the regulating transistor 26 and at the value of the current determined by the potential on the base 44, results in a small decrease in collector current. This decrease of collector current is accompanied by a decrease of the current passing through load $R_L$, which results in a rise in potential on the lead 102. This rise in potential is sensed by the voltage comparator circuit 96 and, as will be described, acts to lower the potential on base 44. This condition decreases the static impedance of the transistor 26 to slightly increase the load current so as to increase the potential drop across the resistor $R_L$ and to restore the regulated potential on the lead 102.

A decrease of the effective value of the resistor $R_L$ also causes an increase of potential on the lead 102. It is to be noted that this condition causes only a small increase of collector current of the regulating transistor 26 as determine by the potential on the base 44. The increase of potential on the lead 102 is sensed by the voltage comparator circuit 96 and, as will be described, acts to lower the potential on the base 44 of the regulating transistor 26 so as to decrease the static impedance of the transistor 26 and to increase the current from emitter 42 to collector 40 a required amount. This increase of collector current increases the current passing through the load $R_L$ and causes a fall in potential on the lead 102, thus restoring the regulated potential on the lead 102.

The operation of the voltage comparator circuit 96 and the current amplifier circuit 60 during normal voltage regulation will now be described. During normal voltage regulation, the transistor 117 is biased out of conduction to interrupt the current path through the transistor 124 to the junction 132. Thus, the potential developed on the collector 152 of the transistor 146 from current passing through the transistor 146 and the resistor 158 is impressed through the lead 182 to the base 68 to control conduction of the transistor 64. An increase (positive-going) of potential at the base 148 of the transistor 146 from the lead 102 results in a decrease of potential on the collector 152 of the transistor 146. This decrease (negative-going) of potential is impressed on the base 68 to increase the conduction of the transistor 64, and to increase the potential on the base 50 of the transistor 38. The transistor 38 is thus biased into further conduction and the potential on the base 44 of the transistor 26 is decreased to increase the emitter to collector current through the transistor 26.

The potential impressed on the base 140 of the transistor 138 is also determined by the load potential on the lead 102, which potential acts to vary the current passed from the emitter 142 to the collector 144 of the transistor 138. An increase of potential on the base 140 results in an increase of potential on the collector 144 of the transistor 138 because of the differential amplifier action, as will be described, which potential is impressed on the base 74 of the transistor 66 to decrease its conduction. Thus, the potentials on the collectors 144 and 152 are impressed through the leads 92 and 182 to the bases 74 and 68 of the transistors 66 and 64.

The differential amplifier arrangement is utilized so that changes of gain characteristics of the transistors 64, 66, 138 and 146 have a very small effect on the regulating action. A substantially constant current passes through the current limiting resistor 159 and through the parallel resistors 156 and 158. Thus, changes of the gain characteristics due to ageing or temperature changes, for example, of the transistors 138 and 146 has a relatively small effect on the difference in potential on the collectors 144 and 152. The difference in potential on the leads 92 and 182 is the value which controls the amount of conduction of the transistors 66 and 64 and, in turn, the impedance of the regulating transistor 26. The current-limiting resistor 82 passing a constant current into the transistors 64 and 66 of the first differential amplifier circuit, cancels changes of gain characteristics of the transistors 64 and 66 in a similar manner. Thus, the differential amplifier arrangements of transistors 138, 146, 64 and 66 is utilized to provide reliable regulation independent of temperature changes or ageing of the transistors, for example.

During the regulating operation of the power supply, the potential on the lead 102 is regulated to −25 volts by the action of a servo loop including a voltage comparator 96 and the path to the base 44 of the regulating transistor 26. An increase of potential on the lead 102 resulting from a voltage variation of the source 20 or a small decrease in the value of the load 34 impedance, as discussed, impresses the increase of potential through the constant voltage Zener diode 168 to develop across the resistor 166 for application to the base 148 of the transistor 146, as a potential increase substantially similar in amplitude to the increase on the lead 102. The transistor 146 is thus biased so as to decrease its conduction and this decreased current flow through the resistor 158 results in a decrease of the potential on the collector 152, which decrease is impressed on the base 68 of the transistor 64 to increase its conduction. At the same time, a small increase of potential is impressed on the base 140 of the transistor 138 from the tap 172. However, because of the large decrease of current through the transistor 146 and through the resistor 158, the current passing through the transistor 138 is increased. This increase of current results from the differential action of a constant current passing through the current limiting resistor 159. Thus, there is an increase of potential on the collector 144 of the transistor 138 which is impressed on the base 74 of the transistor 66 to bias it further out of conduction. As a result of this action, the potential on the collector 72 of the transistor 64 is increased because of the decrease of potential on the base 68 to bias the transistor 38 into further conduction and to decrease the potential on the base 44 of the transistor 26. In response to the decrease of potential on the base 44, the static impedance of the transistor 26 is decreased and increased current passes through the load $R_L$ to decrease the potential on the lead 102 so as to correct the original rise in potential. It is to be noted that this operation is continuous. Also, a potential decrease on the lead 102 is corrected in a similar but opposite manner.

Now that the normal regulating action of the power supply has been explained, the action of the overload control circuit 94 resulting from an overload condition such as a short circuit of the load 34, will be described. The ratio of the value of resistor $R_1$ to that of the resistor $R_L$ of the load 34 to the ratio of the value of resistor $R_2$ to that of the resistor $R_3$ is the relation which determines the condition when an overload condition, such as a short circuit, of the load 34 is present. It is to be noted that a short circuit of the load 34 results in the resistance $R_L$ being effectively reduced in value and a current $I_L$ larger than rated current being supplied. The transistor 117 is biased out of conduction during the normal regulating action when the voltage drop across the resistor $R_1$ is less than the voltage drop across the resistor $R_2$. However, when the voltage drop across the resistor $R_1$ is greater than the voltage drop across the resistor $R_2$, resulting from a maximum load current passing through the resistor $R_1$ and the junction 100, the transistor 117 is biased into conduction. Under these conditions, the ratio of $R_1$ to $R_L$ is greater than the ratio of $R_2$ to $R_3$ indicating a decrease of the effective value of the load resistor $R_L$. The minimum effective load resistance $R_{L(min)}$ is equal to $$\frac{R_1 R_3}{R_2}$$

Thus, the maximum current $I_{L(max)}$ which is equal to $$\frac{E_0}{R_{L(min)}}$$

may be expressed as follows:

$$I_{L(max)} = \frac{E_0 R_2}{R_1 R_3}$$

where $E_0$ is equal to the potential on the lead 102 which is the regulated voltage for determining the maximum load current at which the overload control circuit 94 becomes operative. When the load current $I_L$ increases above the maximum rated value so that the voltage drop across the resistor $R_1$ is greater than the voltage drop across $R_2$, the transistor 117 is biased into full conduction. Thus, the transistor 124 is biased into conduction, passing current from the emitter 128 to the collector 130 and into the junction 132 and to the lead 102. The positive potential from the lead 84 is impressed through the transistor 124 and upon the base 68 of the transistor 64 to bias it out of conduction. When the transistor 64 is biased out of conduction, the driver transistor 38 is biased out of conduction and, in turn, the regulating transistor 26 is biased out of conduction to develop a high impedance to flow of load current $I_L$. Thus, the source 20 is effectively disconnected from the load 34 under this overload condition.

The foregoing overload condition with the transistor 117 biased in a conductive state is maintained by a small current flow through the leakage resistor 54 or by a small leakage current through the transistor 26. It is to be noted that when the transistor 26 is of a type with a small leakage current, the leakage resistor 54 is not required. This leakage current passes from the resistor $R_L$ through the resistor $R_1$ as well as through the resistors $R_3$ and $R_2$ to the junction 100 to maintain a potential difference from the base 118 to the emitter 120 of the signal transistor 117. The potential drop across the resistor $R_1$ is greater than the drop across the resistor $R_2$ because of their relative values. The base 118 of the transistor 117 is biased by current passing from the +15 volt unregulated source at the terminal 88 through the resistor 114, through the diode 112 and through the leakage resistor 54. It is to be noted that current through the resistor 114 acts to maintain the diode 112 forward biased during both normal regulation and an overload condition. Also, the transistor 124 is biased into conduction during an overload condition by the +15 volt potential from the terminal 88 to apply the biasing potential to the junction 132 and the base 68 of the transistor 64. Thus, the +15 volt terminal 88 is required to maintain the transistors 117 and 124 biased in conduction during an overload condition.

The transistor 117 and the diode 112 are of similar type materials, so that an increase in impedance characteristics of the diode 112 and the transistor 117 from temperature changes, for example, is similar. Thus, an increase of impedance characteristics resulting in an increased potential difference for biasing the transistor 117 into conduction is cancelled by an increase of potential drop across the diode 112. Therefore, the ratio of potential drop across the resistors $R_1$ and $R_2$ for biasing the transistor 117 into conduction remains constant and the maximum load current $I_L$ at which the overload protection circuit becomes operative remains constant.

When the load 34 returns to a condition such that there is a voltage drop across resistor $R_L$ indicating a required load current of maximum load current or less to cause a decreased voltage $E_0$ to be impressed on the lead 102, the potential drop across resistor $R_1$ will be less than the potential drop across the resistor $R_2$. Thus, the transistor 117 is biased out of conduction, the transistor 124 is biased out of conduction, and the transistor 64 is biased into conduction to cause the transistors 38 and 26 to be biased into conduction. Thus, the normal regulating action of the voltage comparator circuit 96, as previously described, will continue.

While it will be understood that the circuit specification of the power supply of the invention may vary according to the design of any particular application, the following circuit specifications for a power supply are included, by way of example only, suitable to supply a regulated voltage of −25 volts at a maximum load current of 1 ampere to a grounded load from a −32 volt unregulated source:

| Component | | Value |
|---|---|---|
| Transistor 26, Delco (GM) | | 2N173 |
| Transistor 38, Sylvania | | 2N142 |
| Transistor 64, General Electric | | 2N123 |
| Transistor 66, General Electric | | 2N123 |
| Transistor 117, General Electric | | 4JD4A5 |
| Transistor 124, Philco | | T 1275 |
| Transistor 138, Hughes | | HA-7550 |
| Transistor 146, Hughes | | HA-7550 |
| Terminal 88 | volts | +15 |
| Resistor 54 | ohms | 2,000 |
| Resistor 80 | do | 100 |
| Resistor 82 | do | 10,000 |
| Resistor 132 | do | 10 |
| Resistor $R_1$ | do | 2 |
| Resistor $R_2$ | do | 909 |
| Resistor $R_3$ | do | 11,300 |
| Resistor $R_{L(min)}$ | do | 25 |
| Resistor 114 | do | 39,000 |
| Resistor 156 | do | 5,110 |
| Resistor 158 | do | 5,110 |
| Resistor 159 | do | 8,060 |
| Resistor 164 | do | 560 |
| Resistor 166 | do | 1,690 |
| Resistor 174 | do | 200 |
| Resistor 176 | do | 750 |
| Resistor 178 | do | 1,580 |
| Capacitor 180 | microfarads | 350 |
| Diode 112, Hughes | | 6,007 |
| Diode 168, Hoffman | | IN 430A |

It is to be noted that although the power supply has been described as supplying negative potentials relative to ground potential, it may be easily arranged to supply positive potential relative to ground potential by reversing all voltages and changing the transistor types.

Referring now to FIG. 2, which is a graph of load potential versus load current, as well as referring to FIG. 1, the operation of the voltage regulator will be explained in further detail. The constant regulator dissipation line 184 is shown to indicate the power capabilities of the regulating transistor 26. The regulated potential is shown as −25 volts, and the maximum load current is shown as 1 ampere which is equal to $$\frac{E_0 R_2}{R_1 R_3}$$

Thus, the voltage regulator can operate anywhere on a −25 volt line 188. When an overload condition occurs at the maximum load current of 1 ampere, the return path of the load potential $E_0$ and the load current $I_L$ is shown by the turn-off curve 186 which is a straight line. This straight line results from the linear relation between the resistors $R_1$, $R_2$ and $R_3$ in relation to the voltage $E_0$ and ground potential. The slope $$\frac{E_0}{I_L}$$

of the turn-off line may be expressed by the following relation when the transistor 117 is biased into conduction upon the occurrence of an overload condition:

$$\frac{E_0}{I_L} = \frac{R_1 R_3}{R_2}$$

Thus, the return path of the load current and the load voltage is determined only by the values of the resistors $R_1$, $R_2$ and $R_3$ in the two voltage divider circuits. This linear turn-off curve 186 allows the voltage regulator to turn completely off when an overload condition at maximum load current occurs and to turn completely on to supply maximum load upon removal of the overload condition. The operation of the circuit when turning on to supply a load which is less than maximum is shown by a line 190. It is to be noted that conventional voltage regulators utilizing nonlinear turn-off characteristics to give a turn-off line curved to the left of the turn-off line 186 from the disconnected point to the maximum load point result in complete turn-off from maximum load under an overload condition but will not turn completely on under a maximum load condition. When the nonlinear characteristics of some conventional voltage regulators cause the turn-off line to be curved to the right of the turn off line 186, the regulator will turn completely on under full load when an overload condition is removed but may not turn completely off under full load operation when an overload condition occurs or may exceed the permissible dissipation of the transistors. The voltage regulator of this invention is designed to operate with a turn-off curve 186 close to the constant regulator dissipation line 184 without affecting the turn-off or turn-on characteristics of the circuit. It is to be again noted that the ratio of the two voltage dividers controls the turn-off current without dependence upon the amplifying characteristics of the regulating transistor 26. As discussed, the diode 112 and the transistor 117 are of the same type, both of the silicon type, for example, to cancel out any characteristic changes of the two elements resulting from either temperature or ageing, for example. Thus the turn-off characteristics are dependent only upon the values of the resistors $R_1$, $R_2$ and $R_3$.

Thus, there has been described a direct current voltage regulator which acts during normal voltage regulation to maintain a constant load voltage. Upon the occurrence of an overload condition, such as a short circuit, the potential difference across the first and second voltage dividers acts to disconnect the voltage comparator and to increase the impedance of the regulating transistor to effectively disconnect the source from the load. During this overload condition, a small leakage current is passed through the voltage dividers to maintain the regulating transistor in its high impedance state. When the overload condition is removed, the potential across the first and second voltage dividers changes and allows the voltage comparator to be operative to supply full load current to the load. Thus, the overload current is determined independent of variation of the gain characteristics of the transistor elements and the circuit turns completely off during an overload condition and will return to full rated load upon removal of the overload condition.

What is claimed is:

1. A voltage regulator comprising an unregulated source, a series circuit including a variable impedance having a terminal for responding to a disconnecting signal to substantially prevent the flow of current therethrough and a load coupled between terminals of said source, means coupled across said load to develop a signal proportional to minor variations in potential across said load and including means for coupling said proportional signal to said variable impedance to correct said minor variations, overload means including first resistance means coupled in said series circuit for developing a first potential and a second resistance means coupled from between said variable impedance and said first resistance means across said load for developing a second potential representative of the potential across said load and including switching means having either a conductive state or a nonconductive state and responsive to the difference between said first and second potentials developed through said resistance means and coupled to the terminal of said variable impedance, said switching means being biased into a conductive state and applying a disconnecting signal to said variable impedance for effectively disconnecting the unregulated source from said load when current through said load exceeds a predetermined value.

2. A regulator circuit comprising an unregulated voltage source, a series-circuit including a variable impedance having a control element coupled thereto, a fixed impedance and a load coupled between terminals of said source, means coupled in parallel with said load for developing a signal proportional to minor variations in voltage across said load and including means for coupling said proportional signal to a control element of said variable impedance to overcome said minor variations, a voltage divider coupled from between said variable impedance and said fixed impedance to the opposite side of said load, an overload means having either a conductive or a nonconductive state and coupled from between said fixed impedance and said load to said voltage divider and responsive to the difference in potential between that across said fixed impedance and load and across said voltage divider and coupled to said variable impedance for applying a disconnecting signal thereto when current through said load exceeds a predetermined value so as to bias said overload means to a conductive state and increase the impedance of said variable impedance to substantially disconnect said voltage source from said load.

3. A regulator circuit comprising an unregulated voltage source, a series circuit including respectively a variable impedance means having a control terminal, a fixed impedance and a load coupled between terminals of said source, means coupled in parallel with said load for developing a signal proportional to minor variations in voltage across said load and including means for coupling said proportional signal to a control terminal of said variable impedance means to overcome said minor variations, a voltage divider coupled from between said variable impedance means and said fixed impedance to the opposite side of said load from said fixed impedance, overload means capable of being switched either into or out of a state of conduction and coupled from between said fixed impedance and said load to said voltage divider and responsive to the difference in potential between that across said fixed impedance and load and across said voltage divider and coupled to the control terminal of said variable impedance means for applying a disconnecting signal thereto when said overload means is switched into a state of conduction as current through said load exceeds a predetermined value, and a source of biasing potential coupled to said overload means for maintaining said disconnecting signal while said current through said load exceeds said predetermined value.

4. In a regulator circuit, the combination comprising an unregulated voltage source having a first and second terminal, a series circuit including a variable impedance element coupled to the first terminal of said unregulated voltage source, a first fixed impedance and a load coupled respectively in series between said first variable impedance element and a second terminal of said voltage source, comparator means including a first differential amplifier coupled in parallel with said load for developing a signal proportional to minor variations in voltage across said load and including a second differential amplifier coupled to said first differential amplifier and to said series circuit for applying said proportional signal to a control terminal of said variable impedance element to overcome said minor variations, a voltage divider including a second fixed impedance coupled from between said variable impedance element and said first fixed impedance to the second terminal of said load and developing a potential proportional to the potential across said load, overload means capable of being biased to a conductive or a nonconductive state and coupled from between said first fixed impedance and said load to said second fixed impedance of said voltage divider and responsive to the difference in potential between that across said first fixed impedance and said second fixed impedance, and coupled to said variable impedance element for applying a disconnecting signal thereto when current through said load exceeds a predetermined value and bias said overload means into said conductive state.

5. An overload protection circuit for use with a voltage regulator having a series circuit including a variable impedance element and a load connected between terminals of said source, a comparator loop coupled in parallel with said load for developing a signal proportional to minor variations in voltage across said load and means for connecting said proportional signal to a control terminal of said variable impedance element to overcome said minor variations when said loop is operative, comprising first impedance means coupled between said variable impedance element and said load for developing a first potential, second impedance means coupled from one side of said load at a point between said variable impedance element and said first impedance means to the opposite side of said load for developing a second potential proportional to the voltage across said load, and switching means coupled from between said first impedance means and said load to said second impedance means to be rendered conductive or nonconductive in response to the difference in potential of said first and second potentials across said first and second impedance means and including means coupled to said comparator loop for applying an overload signal to bias said switching means into conduction for controlling said comparator loop to be inoperative and to increase the impedance of said impedance element to disconnect said source from said load when said current through said load exceeds a predetermined value.

6. A regulator circuit comprising an unregulated voltage source having first and second terminal, a series circuit including in relative order a variable impedance coupled to said first terminal, a fixed impedance and a load coupled to said second terminal, means connected in parallel with said load including a differential amplifier to develop a proportional signal in response to minor variations of potential across said load and including means for coupling said proportional signal to a control terminal of said variable impedance to overcome said minor variations, voltage divider means coupled from between said variable impedance and said fixed impedance to said second terminal, switching means having either a first state of conduction or a second state of nonconduction and coupled from between said fixed impedance and said load to said voltage divider means to be responsive to the difference in potential across said fixed impedance and said load and across said voltage divider means to supply a disconnecting signal to said variable impedance when current through said load exceeds a predetermined value to bias said switching means to said first state, and a leakage path across said variable impedance for conducting a current to maintain said disconnecting signal while said load is in a condition to pass a current which exceeds said predetermined value.

7. A voltage regulator comprising an unregulated source, a series circuit including a regulating element and a load coupled between terminals of said source, a feedback loop coupled to develop a signal proportional to variations of potential across said load and including amplifying means for coupling said proportional signal to a control terminal of said regulating element, a first impedance means coupled between said regulating element and said load for forming a first voltage divider with said load, a second voltage divider coupled from between said regulating element and said first voltage divider across said load, overload means having a first state where said overload means is conductive and a second state where said overload means is nonconductive and coupled to said first and second voltage dividers to be responsive to the difference in potential between said first and second voltage dividers for developing a disconnecting signal for increasing the impedance of said regulating element to disconnect said source from said load when current through said load exceeds a maximum value and said overload means is biased to said first state, a current leakage path coupled in parallel to said regulating element for passing a current through said first and second voltage dividers to maintain said difference in potential when said regulating element is disconnected, and a source of biasing potential coupled to said overload means for biasing said overload means to maintain said disconnecting signal when said load is in a condition to pass current which exceeds said maximum value.

8. A voltage regulator circuit for supplying current from an unregulated source through a load, comprising regulating means controlled to vary in impedance to load current coupled between one terminal of said source and said load and having a control terminal, voltage comparing means including a first differential amplifier connected to develop a signal proportional to minor variations of potential across said load and including a second differential amplifier connected to said control terminal for responding to said proportional signal to control said regulating means for correcting said minor variations, first voltage dividing means coupled between said regulating means and said load, second voltage dividing means coupled from one side of said load at a point between said regulating means and said first voltage dividing means to the other side of said load and responsive to the voltage developed across said load, overload means controllable to be biased into a first state of conduction or into a second state of nonconductin and coupled between said first and second voltage dividing means responsive to a potential difference having a polarity indicative of a maximum load current for being biased to said first state to apply an overload signal to said second differential amplifier for disconnecting said regulating means, a current leakage path coupled in parallel with said regulating element to conduct current for maintaining said potential difference when said regulating element is disconnected, and a source of biasing potential for biasing said overload means to maintain said overload signal when said polarity is indicative of said maximum load current.

9. A regulator circuit to supply current at a constant potential from an unregulated source through a load coupled between terminals of said source and comprising a regulating transistor having an emitter-collector path coupled between said source and said load and having a base, an impedance coupled between said emitter-collector path and said load to form a first voltage divider with said load, a second voltage divider coupled from between said regulating transistor and said impedance across said load for responding to variations of potential across said load, a comparator circuit including a first differential amplifier coupled across said load for developing a signal proportional to variations of potential across said load, a source of maintaining potential, a second differential amplifier coupled between said base of said regulating transistor and said source of maintaining potential and connected to respond to said proportional signal for controlling the impedance of said regulating transistor to correct said variations of potential, a first overload transistor having a base coupled to said first voltage divider and having an emitter-collector path coupled to said second voltage divider, a second overload transistor having a base coupled to the emitter-collector path of said first overload transistor and having an emitter-collector path coupled between said source of maintaining potential and said second differential amplifier to overcome said proportional signal and disconnect said regulating transistor when said first overload transistor is biased into conduction in response to a predetermined polarity of a potential difference between said first and second voltage dividers indicative of a greater than maximum load current, and a leakage path across said emitter-collector path of said regulating transistor for passing current through said first and second voltage dividers to maintain said potential difference when said polarity is indicative that greater than maximum current would pass through said load.

10. A power supply circuit to provide load current at a constant potential from an unregulated source to a load and to disconnect said source from said load during an overload condition when said load current exceeds a predetermined value, comprising a regulating transistor having a load current path coupled between said source and said load and having a base terminal, signal amplifier means coupled to said base terminal for controlling the impedance of said regulating transistor and having a control terminal, a voltage comparator coupled across said load to respond to potential variations and coupled to said control terminal of said amplifier means for correcting said potential variations, a first resistor coupled between said load current path of said regulating transistor and said load for forming a first voltage divider with said load, a second voltage divider coupled from one side of said load at a point between said load current path of said regulating element and said first resistor to the other side of said load for responding to the potential across said load, a first signal forming transistor having a base coupled to said first voltage divider and having an emitter-collector path coupled to said second voltage divider, a second signal forming transistor coupled between said emitter-collector path of said first signal forming transistor and said amplifier means and being biased into conduction for developing an overload signal in response to a predetermined polarity of potential between said first and second voltage dividers for biasing said first signal forming transistor into conduction indicative of an overload condition causing said load current to exceed said predetermined value, said overload signal acting to increase the impedance of said regulating element to decrease said load current to a maintaining current having a small value relative to said predetermined value, said maintaining current passing through said first and second voltage dividers to maintain said overload signal for disconnecting said source from said load during the occurrence of said overload condition.

11. A circuit connected between the positive and negative terminals of an unregulated source to supply current through a load at a constant potential, comprising a regulating transistor having an emitter-collector path coupled between said negative terminal of said source and said load and having a base terminal, a resistor coupled between said regulating transistor and said load to form a first voltage divider with said load, a second voltage divider coupled between said regulating transistor and said resistor to said positive terminal for developing a potential proportional to the potential developed across said load, a comparator loop including a first differential amplifier coupled to develop a signal proportional to the potential variation across said load and including a second differential amplifier coupled between said base terminal and a source of biasing potential being positive relative to said positive terminal of said source for responding to said proportional signal developed by said comparator loop to vary the impedance of said regulating transistor for correcting said potential variation, a first control transistor having a base coupled to said first voltage divider and to said source of biasing potential and having an emitter-collector path with one end coupled to said second voltage divider for responding to the potential developed thereby, a second control transistor having a base coupled to the other end of said emitter-collector path of said first control transistor and having an emitter-collector path coupled between said source of biasing potential and said second differential amplifier, said first control transistor responding to the potential difference across said first and second voltage dividers for being biased into conduction to in turn bias said second control transistor into conduction to develop an overload signal for disconnecting said regulating transistor in response to an overload current condition, said source of biasing potential maintaining said overload signal, and a leakage path across said regulating transistor for passing current from said first and second voltage dividers to render them responsive for maintaining said control transistor biased in conduction during said overload condition.

References Cited in the file of this patent
UNITED STATES PATENTS

| | | |
|---|---|---|
| 825,023 | Marantette | Feb. 25, 1958 |
| 2,832,900 | Ford | Apr. 29, 1958 |
| 2,888,633 | Carter | May 26, 1959 |
| 2,896,151 | Zelinka | July 21, 1959 |
| 2,904,742 | Chase | Sept. 15, 1959 |
| 2,915,693 | Harrison | Dec. 1, 1959 |
| 2,922,945 | Norris et al. | Jan. 26, 1960 |

OTHER REFERENCES

"The Emitter-Coupled Differential Amplifier," Slaughter, IRE Transactions, March 1956, pp. 51–53.

Dodge: "A Transistorized Overload-Proof Electronic Regulator," Transistor and Solid State Circuit Conference, Digest of Technical Papers, Feb. 20, 1958, pp. 35–36.